US008250258B2

(12) United States Patent  
Su et al.

(10) Patent No.: US 8,250,258 B2  
(45) Date of Patent: Aug. 21, 2012

(54) HYBRID SERIAL PERIPHERAL INTERFACE DATA TRANSMISSION ARCHITECTURE AND METHOD OF THE SAME

(75) Inventors: Wei-Lu Su, Hsinchu (TW); Jian-Liang Chen, Hsinchu (TW); Tsung-Han Tsai, Hsinchu (TW); Shih-Ming Hwang, Hsinchu (TW)

(73) Assignee: Asix Electronics Corp., Hsinchu (TW)

( * ) Notice: Subject to any disclaimer, the term of this patent is extended or adjusted under 35 U.S.C. 154(b) by 0 days.

(21) Appl. No.: 12/965,058

(22) Filed: Dec. 10, 2010

(65) Prior Publication Data

US 2012/0089754 A1 Apr. 12, 2012

(30) Foreign Application Priority Data

Oct. 8, 2010 (TW) ................................ 99134431 A

(51) Int. Cl.
*G06F 3/00* (2006.01)
*G06F 5/00* (2006.01)
*G06F 13/00* (2006.01)

(52) U.S. Cl. ................ 710/38; 710/31; 710/56

(58) Field of Classification Search ............... None
See application file for complete search history.

(56) References Cited

U.S. PATENT DOCUMENTS

2002/0133662 A1* 9/2002 Cheung ............... 710/310  
2011/0072297 A1* 3/2011 Huang ............... 713/500

* cited by examiner

*Primary Examiner* — Chun-Kuan Lee  
*Assistant Examiner* — Ronald Modo  
(74) *Attorney, Agent, or Firm* — Ming Chow; Sinorica, LLC

(57) ABSTRACT

A hybrid serial peripheral interface (SPI) data transmission architecture adapted in a network device for connecting a host and a network is provided. The architecture comprises a RX buffer and RX SPI for maintaining a data receiving process, a TX buffer and TX SPI for maintaining a data transmission process, a configuration and status register and a hybrid SPI processing module. The hybrid SPI processing module makes the RX SPI performs the data transmission process as well when the RX SPI idles and the data transmission process proceeds at the same time and makes the TX SPI to performs the data receiving process as well when the TX SPI idles and the data receiving process proceeds at the same time. A hybrid SPI data transmission method is disclosed herein as well.

15 Claims, 5 Drawing Sheets

HYBRID SERIAL PERIPHERAL INTERFACE DATA TRANSMISSION ARCHITECTURE AND METHOD OF THE SAME

RELATED APPLICATIONS

This application claims priority to Taiwan Application Serial Number 099134431, filed Oct. 8, 2010, which is herein incorporated by reference.

BACKGROUND

1. Technical Field

The present disclosure relates to a data transmission architecture. More particularly, the present disclosure relates to a hybrid serial peripheral interface (SPI) data transmission architecture and a hybrid SPI data transmission method.

2. Description of Related Art

Network is an important data communication media. In order to communicate with the network, a network device is necessary to be equipped in a host to deal with the data transmitted between the host and the network. Half-duplex data transmission is adapted in part of the network devices, which means that the data transmitting process and the data receiving process cannot be performed in the data transmission path at the same time. On the other hand, full-duplex data transmission is adapted in another part of the network devices, which means that both of the data transmitting process and the data receiving process can be performed in different ports of the data transmission path at the same time.

Usually, the serial peripheral interface (SPI) is adapted to perform the data communication between the host and the peripheral network device. In a SPI having low operation frequency, a single port to perform single way of data transmitting or receiving process is not efficient. However, a dual-port SPI design often uses one full-duplex port to perform data transmitting process and uses the other full-duplex port to perform data receiving process. The port does nothing when it is idling. Thus, the bandwidth of the dual port is not fully utilized.

Accordingly, what is needed is a hybrid SPI data transmission architecture and a hybrid SPI data transmission method to fully utilize the data transmission port. The present disclosure addresses such a need.

SUMMARY

An aspect of the present disclosure is to provide a hybrid serial peripheral interface (SPI) data transmission architecture adapted in a network device for connecting a host and a network, wherein the hybrid SPI data transmission architecture comprises a receiving (RX) buffer, a transmitting (TX) buffer, a data transmission SPI, a configuration and status register and a hybrid SPI processing module. The RX buffer and the TX buffer are connected to the network. The data transmission SPI is connected to the host. The configuration and status register generates a data transmitting interrupt or a data receiving interrupt to the host according to a status of the RX buffer and the TX buffer such that the host performs a data transmitting process or a data receiving process according to the data transmitting interrupt or the data receiving interrupt. The hybrid SPI processing module controls data transmission paths between the data transmission SPI and the RX buffer and between the data transmission SPI and the TX buffer such that data in the host is transmitted to the network through the TX buffer when the data receiving process is not performed and when the host receives the data transmitting interrupt, and a data from the network is received to the host through the RX buffer when the data transmitting process is not performed and when the host receives the data receiving interrupt.

Another aspect of the present disclosure is to provide a hybrid serial to peripheral interface (SPI) data transmission architecture having dual ports adapted in a network device for connecting a host and a network, wherein the hybrid SPI data transmission architecture comprises a receiving (RX) buffer, a transmitting (TX) buffer, a data receiving SPI, a data transmitting SPI, a configuration and status register and a hybrid SPI processing module. The RX buffer and the TX buffer are connected to the network. The data receiving SPI is connected to the host to receive data from the network through the RX buffer during a data receiving process such that the host receives the data from the network through the data receiving SPI. The data transmitting SPI is connected to the host to transmit data from the host to the TX buffer and further to the network during a data transmitting process. The configuration and status register generates a data transmitting interrupt and/or a data receiving interrupt to the host according to a status of the RX buffer and the TX buffer such that the host performs the data transmitting process and/or the data receiving process according to the data transmitting interrupt and/or the data receiving interrupt. The hybrid SPI processing module controls data transmission paths between the data transmission SPI and the RX buffer and between the data transmission SPI and the TX buffer such that when the data receiving SPI is idling and the data transmitting process is performed, part of the data is transmitted through the data receiving SPI to the TX buffer and further to the network, and when the data transmitting SPI is idling and the data receiving process is performed, part of the data is received from the network through the RX buffer to the data transmitting SPI and further to the host.

Yet another aspect of the present disclosure is to provide a hybrid serial peripheral interface (SPI) data transmission method adapted in a hybrid SPI data transmission architecture of a network device, wherein the network device connects a host and a network, the hybrid SPI data transmission method comprises the steps as follows. Whether a data transmitting interrupt or a data receiving interrupt is generated according to the status of a receiving (RX) buffer and a transmitting (TX) buffer in the hybrid SPI data transmission architecture by a configuration and status register in the hybrid SPI data transmission architecture is determined. When both the data transmitting interrupt and the data receiving interrupt are generated, the host performs a data transmitting process through a data transmitting SPI to transmit data from the host to the TX buffer and further to the network, and the host performs a data receiving process through a data receiving SPI to receive data from the network to the RX buffer such that the host receives the data from the network through the RX buffer. When the data receiving interrupt is not generated and the data transmitting interrupt is generated, the host determines that the data receiving SPI is idling and the data transmitting process is performed to make part of the data transmitted through the data receiving SPI to the TX buffer and further to the network. When the data transmitting interrupt is not generated and the data receiving interrupt is generated, the host determines that the data transmitting SPI is idling and the data receiving process is performed to make part of the data received from the network through the RX buffer such that the host receives the data from the network through the RX buffer.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
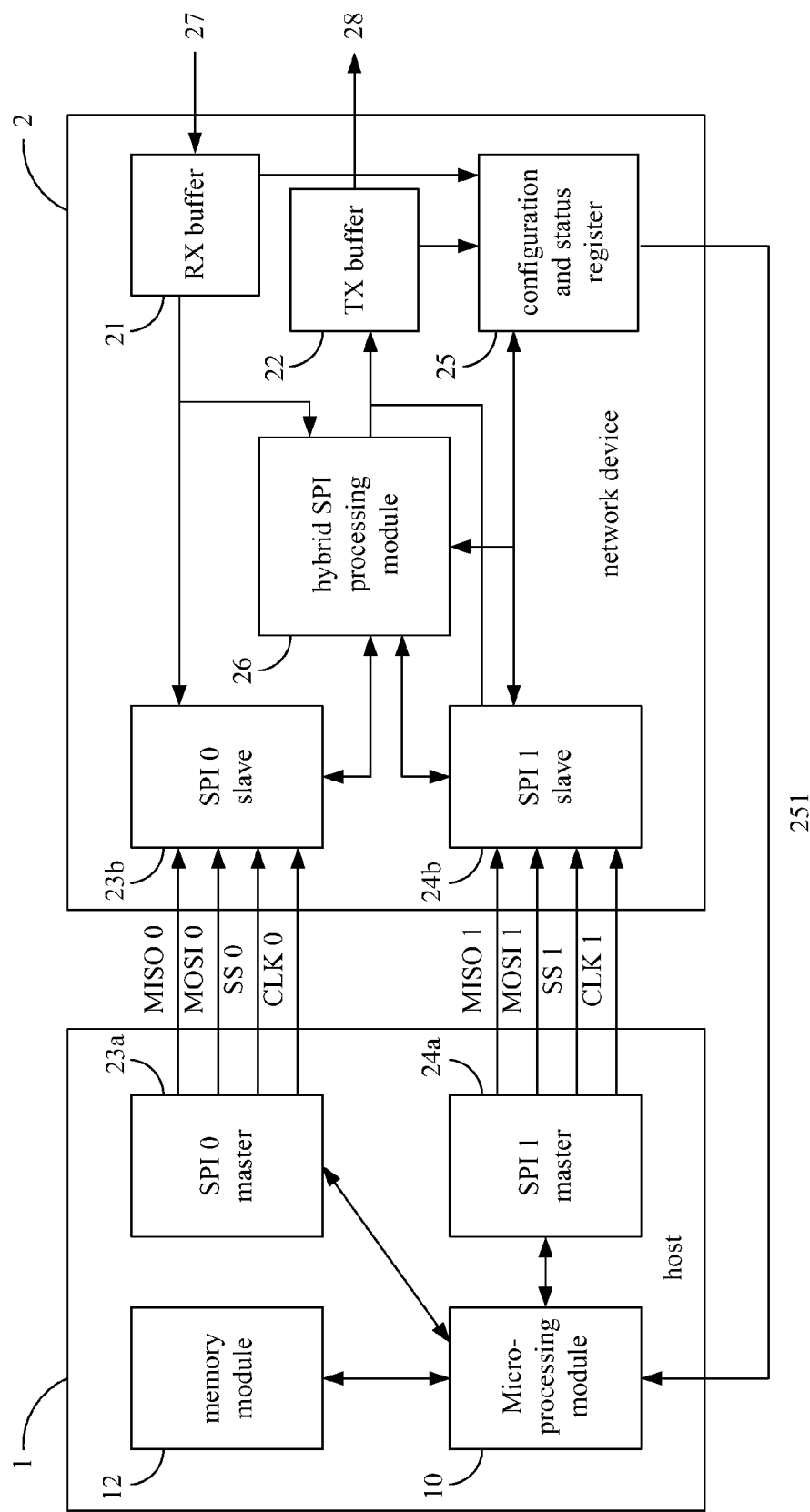
FIG. 1 is a block diagram of a host and a network device in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Please refer to FIG. 1. FIG. 1 is a block diagram of a host 1 and a network device 2 in an embodiment of the present disclosure.

The host 1 comprises a micro-processing module 10 and a memory module 12. The micro-processing module 10 can receives packets from the network device 2 and stores in the memory module 12. The memory module 12 can transmit the data from higher hierarchy to the network device 2 through the micro-processing module 10 and further to a network (not shown).

The network device 2 connects the host 1 and the network. The network device 2 has a dual-port hybrid serial peripheral interface (SPI) data transmission architecture. The hybrid SPI data transmission architecture comprises a receiving (RX) buffer 21, a transmitting (TX) buffer 22, a data receiving SPI, a data transmitting SPI, a configuration and status register 25 and a hybrid SPI processing module 26. The RX buffer 21 and the TX buffer 22 are connected to the network respectively. The configuration and status register 25 generates a data transmitting interrupt and/or a data receiving interrupt 251 to the host 1 according to a status of the RX buffer 21 and the TX buffer 22 such that the host 1 performs the data transmitting process and/or the data receiving process according to the data transmitting interrupt and/or the data receiving interrupt 251.

The data receiving SPI (SPI 0) and the data transmitting SPI (SPI 1) are connected to the host 1. The data receiving SPI substantially comprises a data receiving SPI master 23a and a data receiving SPI slave 23b. The data transmitting SPI substantially comprises a data transmitting SPI master 24a and a data transmitting SPI slave 24b. The data receiving SPI master 23a and the data transmitting SPI master 24a are substantially disposed in the host 1. The data receiving SPI slave 23b and the data transmitting SPI slave 24b are substantially disposed in the network device 2.

In the present embodiment, there are four pins between the data receiving SPI master 23a and data receiving SPI slave 23b, and there are also four pins between the data transmitting SPI master 24a and the data transmitting SPI slave 24b. The four pins are used to transmit four different signals from the master end to the slave end, wherein the four signals are master-in-slave-out, master-out-slave-in, select and clock respectively. In FIG. 1, the four signals between the data receiving SPI master 23a and data receiving SPI slave 23b are labeled as MISO 0, MOSI 0, SS 0 and CLK 0, where the four signals between the data transmitting SPI master 24a and the data transmitting SPI slave 24b are labeled as MISO 1, MOSI 1, SS 1 and CLK 1.

The master-in-slave-out signal stands for the signal transmitted from the data receiving/transmitting SPI slave 23b/24b to the data receiving/transmitting SPI master 23a/24a, such as a packet. The master-out-slave-in signal stands for the signal transmitted from the data receiving/transmitting SPI master 23a/24a to the data receiving/transmitting SPI slave 23b/24b, such as a packet or a command from the micro-processing module 10. The select signal is generated according to the micro-processing module 10 to notify the data receiving/transmitting SPI slave 23b/24b that a data transmission process is going to be performed. The clock signal acts as a reference frequency to synchronize the data receiving/transmitting SPI.

The hybrid SPI processing module 26 controls the data receiving/transmitting SPI to control the data transmission paths between the data transmission SPI and the RX buffer 21 and between the data transmission SPI and the TX buffer 22.

In an embodiment, the RX buffer 21 performs a cyclic redundancy check (CRC) and a packet length calculation when receiving data from the network to through the receiving path 27. The CRC is used to make sure that packet is complete, such that the configuration and status register 25 transmits a result of the packet length calculation and the data receiving interrupt to the micro-processing module 10 when the result of the CRC reveals that the packet is complete and without loss. The micro-processing module 10 relocates a is memory space in the memory module 12 according to the result of the packet length calculation. Further, the micro-processing module 10 initializes the data receiving process and generates a data receiving SPI read command such that the data in the RX buffer (from the network) transmit to the micro-processing module 10 through the data receiving SPI and further to the memory module 12 to complete the data receiving process.

In an embodiment, before the data transmitting process is performed, the micro-processing module 10 first asks the TX buffer 22 to perform a capacity check to verify whether the capacity of the TX buffer 22 is enough. When the TX buffer 22 has enough capacity, the micro-processing module 10 initializes the data transmitting process to generates a data transmitting SPI write command such that the data to be transmitted is retrieved from the memory module 12 and is sent to the TX buffer 22 through the data transmitting SPI and further to the network through the transmitting path 28 to complete the data transmitting process.

After the data receiving process is complete, the micro-processing module 10 waits for the next data receiving interrupt. However, when the RX buffer 21 does not receive any data from the network such that no data receiving interrupt is generated, the corresponding data receiving SPI idles. If the data transmitting process is performed during the idling of the data receiving SPI, the hybrid SPI processing module 26 controls data transmission paths between the data transmitting SPI and the TX buffer 22 and between the data receiving SPI and the TX buffer 22 according to the command from the micro-processing module 10 such that the micro-processing module 10 in the host 1 transmits part of the data to the data receiving SPI, the SPI that includes the data receiving SPI master 23a and slave 23b, to further transmit the part of the data to the TX buffer 22 and further to the network. It's noticed that the hybrid SPI processing module 26 has to keep calculating a first transmitting packet start address and a second transmitting packet start address (the address of a first packet that is about to be transmitted and the address of a second packet next to the first packet) to make the host 1 retrieve the first transmitting packet start address and the second transmitting packet start address from the configuration and status register 25 such that when the data receiving SPI is idling during the transmission of the data from the host 1 to the TX buffer 22 according to the first transmitting packet start address, other part of the data can be transmitted to the TX buffer 22 through the data receiving SPI according to the second transmitting packet start address.

On the other hand, after the data transmitting process is complete or when the TX buffer 22 performs the capacity check, the micro-processing module 10 waits for the next data transmitting interrupt. However, when no data needs to be transmitted or the capacity of the TX buffer 22 is not enough such that no data transmitting interrupt is generated, the corresponding data transmitting SPI idles. If the data receiving process is performed during the idling of the data transmitting SPI, the hybrid SPI processing module 26 controls to data transmission paths between the data transmitting SPI and the TX buffer 22 and between the data receiving SPI and the TX buffer 22 according to the command from the micro-processing module 10 such that the data transmitting SPI, the SPI that includes the data transmitting SPI master 24a and slave 24b, receives part of the data in the RX buffer 21 from the network such that the part of the data is further received by the micro-processing module 10 and is stored in the memory module 12. It's noticed that the hybrid SPI processing module 26 has to keep calculating a first receiving packet start address and a second receiving packet start address (the address of a first packet that is about to be received and the address of a second packet next to the first packet) to make the host 1 retrieve the first transmitting packet start address and the second transmitting packet start address from the configuration and status register 25 such that when the data transmitting SPI is idling during the receipt of the data in the RX buffer 21 from the network to the data receiving SPI according to the first transmitting packet start address, other part of the data can be received from the RX buffer 21 through the data transmitting SPI according to the second transmitting packet start address.

Figure 2:
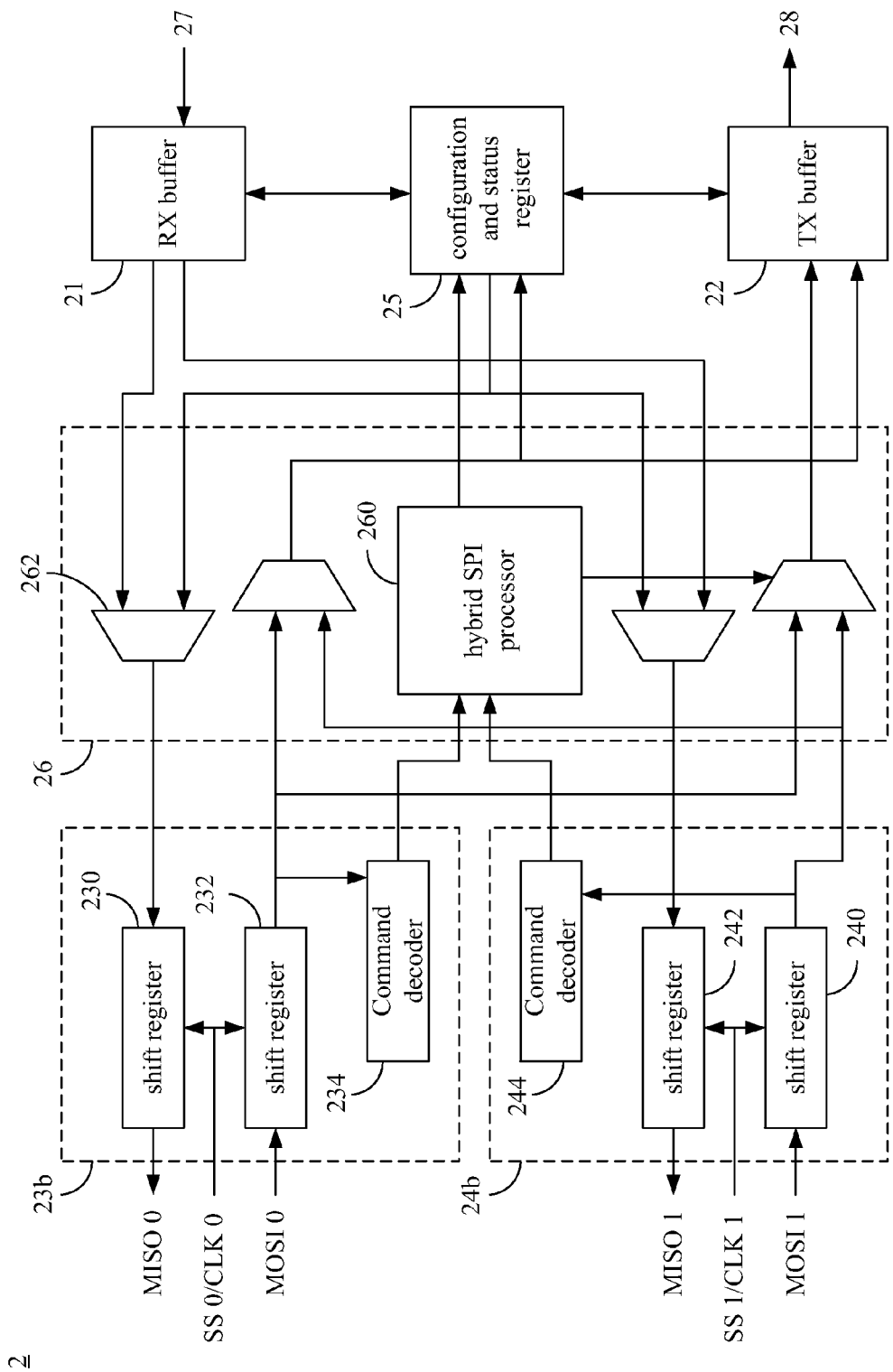
FIG. 2 is a detail diagram of the network device of an embodiment of the present disclosure.

Please refer to FIG. 2. FIG. 2 is a detail diagram of the network device 2 of an embodiment of the present disclosure. The data receiving/transmitting SPI slave 23b/24b further comprises shift registers 230, 232, 240, 242 and command decoders 234 and 244 respectively. The shift registers 230 and 240 deal with the signals of MISO 0 and MISO 1 respectively. The shift registers 232 and 242 deal with the signals of MOSI 0 and MOSI 1 respectively. Each shift register receives the corresponding select signals SS 0, SS 1 and clock signals CLK 0, CLK 1 respectively.

The micro-processing module 10 sends command to the command decoder 234 and 244 through MOSI 0 and MOSI 1. When the data receiving process is initializing, a data receiving command is sent, and when the data transmitting process is initializing, a data transmitting command is sent such that the data receiving/transmitting SPI slave 23b, 24b can receive the command to initialize the data receiving/transmitting process. The hybrid SPI processing module 26 further comprises a hybrid SPI processor 260 and a plurality of multiplexer 262. The command decoders 234 and 244 further decodes the command, and transmit the address and other information of the data to the hybrid SPI processor 260. The hybrid SPI processor 260 further controls the multiplexer 262 according to the command to further control the data transmission path. Thus, the hybrid SPI processor 260 can make the idling SPI (whether data receiving SPI or data transmitting SPI) support the other SPI to fully utilize the bandwidth. Substantially, the hybrid SPI processor 260 can perform data transmission process upon the receipt of one data transmitting command and one data receiving command at the same time, two data receiving commands, two data receiving commands, two data transmitting commands or other hybrid command to increase the efficiency of the dual-port SPI.

Figure 3:
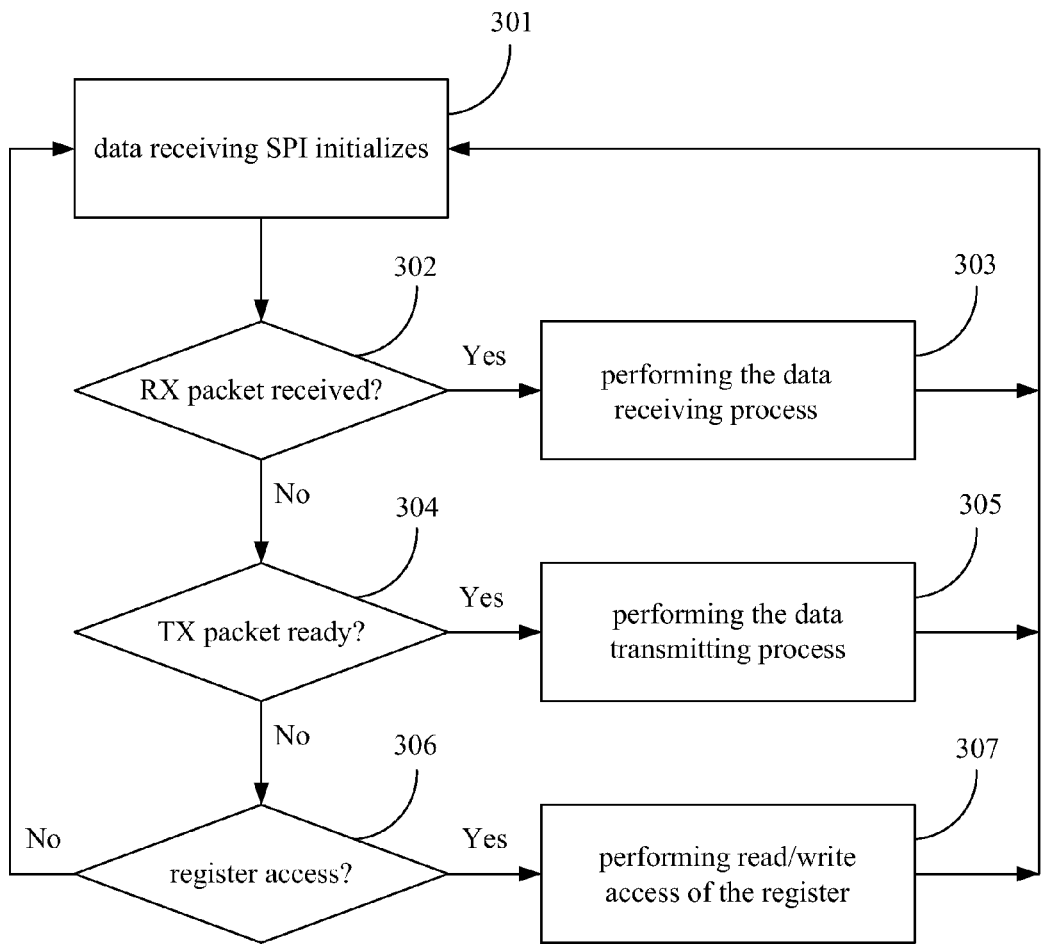
FIG. 3 is a flow chart of a hybrid SPI data transmission method in an embodiment of the present disclosure.

Please refer to FIG. 3. FIG. 3 is a flow chart of a hybrid SPI data transmission method in an embodiment of the present disclosure. The hybrid SPI data transmission method can be adapted in the hybrid SPI data transmission architecture depicted in FIG. 1 and FIG. 2. It's noticed that the flow depicted in FIG. 3 is specifically adapted in the data receiving SPI (SPI 0) depicted in FIG. 1.

In step 301, the data receiving SPI initializes. The RX buffer 21 checks whether a packet is received in step 302 such that the configuration and status register 25 determines whether the data receiving interrupt is generated or not. When the RX buffer 21 detects that a packet is received, the data receiving is process is performed in step 303 such that the data receiving SPI receives the data in the RX buffer 21 from the network to further make the host 1 receives the data. After the data receiving process is complete, the flow turns back to the step 301. When there is no received packet, whether there is a packet that needs to be transmitted is determined in step 304. When there is a packet that is ready to be transmitted, the data receiving SPI is controlled to perform the data transmitting process in step 305 to transmit the data from the host 1 to the TX buffer and further to the network. After the data receiving SPI completes the data transmitting process, the flow turns back to the step 301.

If there is no packet that needs to be transmitted, whether the register needs to be accessed is determined in step 306. When the host 1 needs to perform read/write process or monitoring process on the configuration and status register 25, the access of the register is processed in step 307 and turns back to the step 301 after the access is complete. When the register needs not to be accessed, the flow turns back to the step 301 to maintain the status of the data receiving SPI after the initialization.

Figure 4:
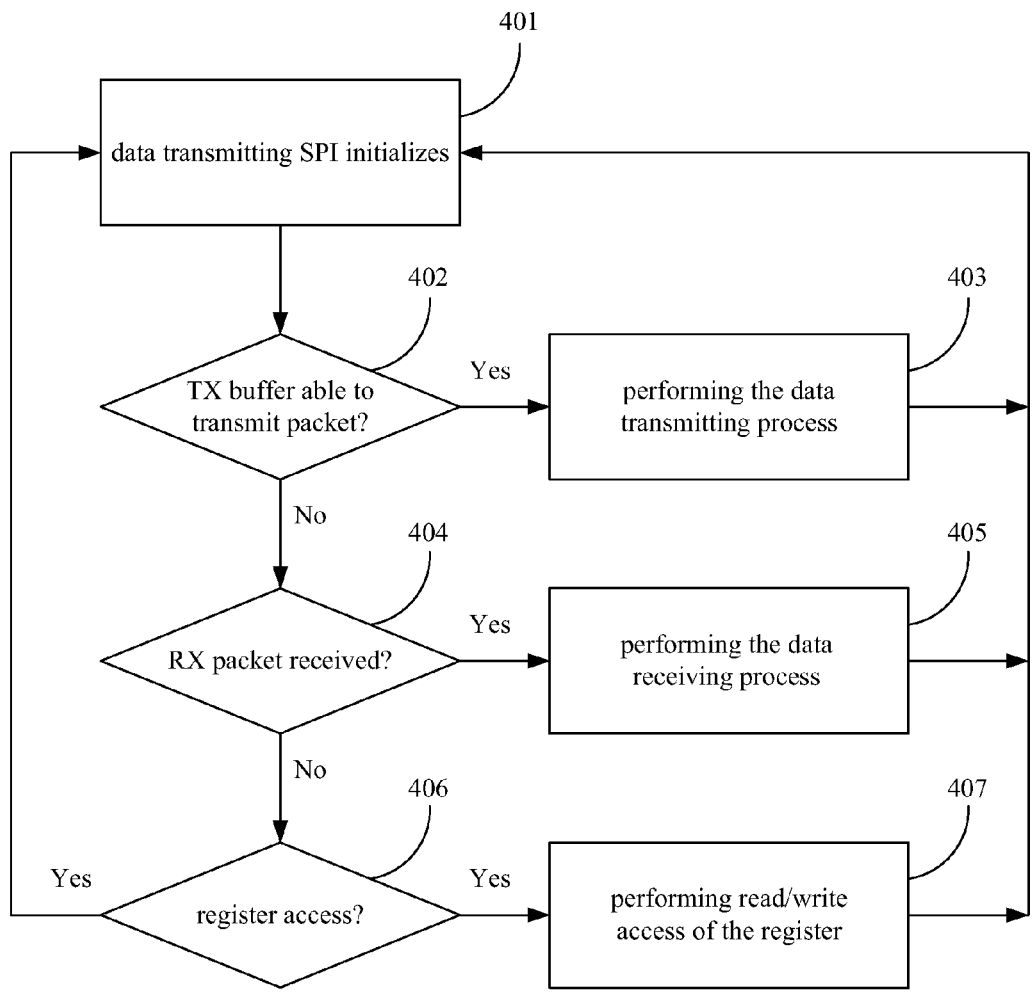
FIG. 4 is a flow chart of a hybrid SPI data transmission method in an embodiment of the present disclosure.

Please refer to FIG. 4. FIG. 4 is a flow chart of a hybrid SPI data transmission method in an embodiment of the present disclosure. The hybrid SPI data transmission method can be adapted in the hybrid SPI data transmission architecture depicted in FIG. 1 and FIG. 2. It's noticed that the flow depicted in FIG. 4 is specifically adapted in the data transmitting SPI (SPI 1) depicted in FIG. 1.

In step 401, the data transmitting SPI initializes. The TX buffer 21 checks whether the capacity is enough in step 402 such that the configuration and status register 25 determines whether the data transmitting interrupt is generated or not. When the TX buffer 22 makes sure that the capacity is enough, the data transmitting process is performed in step 403 such that the data in the host 1 is transmitted to the TX buffer 22 and further to the network. After the data transmitting process is complete, the flow turns back to the step 401. When the TX buffer 22 determines that the capacity is not enough, whether there is a packet that needs to be received is determined in step 404. When there is a packet that is going to be received, the data receiving SPI is controlled to perform the data receiving process in step 405 to make the data receiving SPI receive the data from the RX buffer 21, and further make the host 1 receives the data from the data receiving SPI. After the data transmitting SPI completes the data receiving process, the flow turns back to the step 401.

If there is no packet that needs to be received, whether the register needs to be accessed is determined in step 406. When the host 1 needs to perform read/write process or monitoring process on the configuration and status register 25, the access of the register is processed in step 407 and turns back to the step 401 after the access is complete. When the register needs not to be accessed, the flow turns back to the step 401 to maintain the status of the data transmitting SPI after the initialization.

Figure 5:
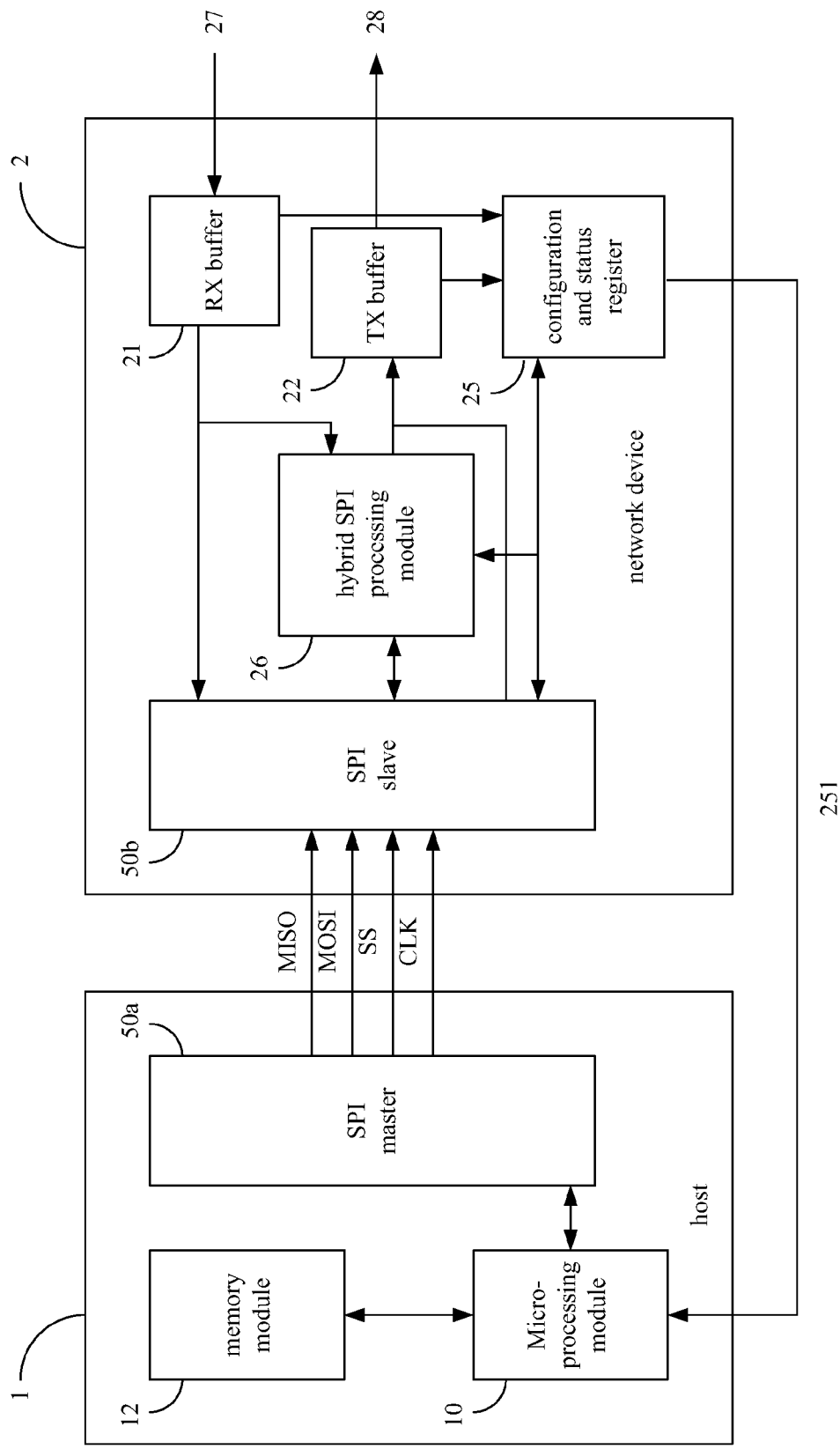
FIG. 5 is a block diagram of the host and the network device in another embodiment of the present disclosure.

It's noticed that only the dual-port hybrid SPI is used as example in the above embodiments. However, the novel feature of the present disclosure can be adapted in a single port SPI as well. Please refer to FIG. 5. FIG. 5 is a block diagram of the host 1 and the network device 2 in another embodiment of the present disclosure.

The host 1 comprises the micro-processing module 10 and the memory module 12 as well. The function and the location of the micro-processing is module 10 and the memory module 12 are about the same as those depicted in FIG. 1, therefore, no more detail discussion is needed.

The network device connects the host 1 and the network. In the present embodiment, the network device 2 comprises a single-port hybrid SPI. The hybrid SPI comprises a RX buffer 21, a TX buffer 22, a data transmission SPI, a configuration and status register 25 and a hybrid SPI processing module 26.

The function of the RX buffer 21, the TX buffer 22 and the configuration and status register 25 are about the same as those depicted in FIG. 1, therefore, no more detail discussion is needed.

The data transmission SPI is connected to host 1. The data transmission SPI comprises a data transmission SPI master 50a and a data transmission SPI slave 50b. The data transmission SPI master 50a is substantially disposed in the host 1 and the data transmission SPI slave 50b is substantially disposed in the network device 2. Four pins can also be adapted to connect the data transmission SPI master 50a and the data transmission SPI slave 50b to transmit MISO, MOSI, SS and CLK.

The hybrid SPI processing module 26 controls the data transmission paths between the data transmission SPI and the RX buffer 21 and between the data transmission SPI and the TX buffer 22. The data transmitting/receiving process is already shown in previous description. Hence, no more detail discussion is needed here. When the data transmission SPI does not perform the data receiving process and the host 1 receives a data transmitting interrupt, the hybrid SPI processing module 26 controls the data transmission path to transmit the data from the host 1 to the RX buffer 22 and further to the network. When the data transmission SPI does not perform the data transmitting process and the host 1 receives a data receiving interrupt, the hybrid SPI processing module 26 controls the data transmission path to receive the data in the RX buffer 22 from the network and further makes the host 1 receive the data.

Consequently, the data transmission path of the single-port hybrid SPI data transmission architecture can perform data transmitting process and data receiving process according to the interrupt that the host 1 receives. The data transmission path can be fully utilized to avoid the waste of bandwidth when only single direction of data transmission is adapted.

The advantage of the hybrid SPI data transmission architecture of the present disclosure is that the port of the data transmission SPI can perform the data transmitting process and the data receiving process in different time intervals such that the efficiency of the port increases. When dual-port hybrid SPI is used, the data transmitting SPI and the data receiving SPI can support each other when one of them is idling to fully utilize the bandwidth.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A hybrid serial peripheral interface (SPI) data transmission architecture having dual ports adapted in a network device for connecting a host and a network, wherein the hybrid SPI data transmission architecture comprises:
   a receiving (RX) buffer and a transmitting (TX) buffer connected to the network;
   a data receiving SPI connected to the host to receive data from the network through the RX buffer during a data receiving process such that the host receives the data from the network through the data receiving SPI;
   a data transmitting SPI connected to the host to transmit data from the host to the TX buffer and further to the network during a data transmitting process;
   a configuration and status register to generate a data transmitting interrupt and/or a data receiving interrupt to the host according to a status of the RX buffer and the TX buffer such that the host performs the data transmitting process and/or the data receiving process according to the data transmitting interrupt and/or the data receiving interrupt; and
   a hybrid SPI processing module to control data transmission paths between the data transmission SPI and the RX buffer and between the data transmission SPI and the TX buffer such that when the data receiving SPI is idling and the data transmitting process is performed, part of the data is transmitted through the data receiving SPI to the TX buffer and further to the network, and when the data transmitting SPI is idling and the data receiving process is performed, part of the data is received from the network through the RX buffer to the data transmitting SPI and further to the host.

2. The hybrid SPI of claim 1, wherein the data receiving SPI substantially comprises a data receiving SPI master and a data receiving SPI slave, wherein the data receiving SPI master is disposed in the host and the data receiving SPI slave is disposed in the network device, and the data transmitting SPI substantially comprises a data transmitting SPI master and a data transmitting SPI slave, wherein the data transmitting SPI master is disposed in the host and the data transmitting SPI slave is disposed in the network device.

3. The hybrid SPI of claim 2, wherein each of the data receiving SPI slave and the data transmitting SPI slave comprises a command decoder respectively, the hybrid SPI processing module receives a command from the host through the command decoder of each of the data receiving SPI slave and the data transmitting SPI slave to control the data transmission paths between the data transmission SPI and the RX buffer and between the data transmission SPI and the TX buffer.

4. The hybrid SPI of claim 3, wherein the hybrid SPI processing module further comprises a hybrid SPI processor and a plurality of multiplexers, the hybrid SPI processor controls the multiplexers according to the command to control the data transmission paths between the data transmission SPI and the RX buffer and between the data transmission SPI and the TX buffer.

5. The hybrid SPI of claim 2, wherein each of the data receiving SPI master and the data transmitting SPI master transmits a select signal and a clock signal to the data receiving SPI slave and the data transmitting SPI slave respectively.

6. The hybrid SPI of claim 1, wherein the RX buffer further performs a cyclic redundancy check (CRC) and a packet length calculation, when the host receives the data receiving interrupt, the host performs the data receiving process according to a result of the CRC and the packet length calculation that is retrieved by the configuration and status register.

7. The hybrid SPI of claim 6, wherein the host relocates a memory space according to the result of the packet length calculation.

8. The hybrid SPI of claim 1, wherein the TX buffer further performs a capacity check to make the configuration and status register generate the data transmitting interrupt when a capacity of the TX buffer is enough to further make the host perform the data transmitting process.

9. The hybrid SPI of claim 1, wherein when the data receiving SPI is idling and the data transmitting process is performed, the hybrid SPI processing module keeps calculating a first transmitting packet start address and a second transmitting packet start address to make the host retrieve the first transmitting packet start address and the second transmitting packet start address from the configuration and status register and transmit the data from the host to the TX buffer through the data receiving SPI and the data transmitting SPI according to the first transmitting packet start address and the second transmitting packet start address.

10. The hybrid SPI of claim 1, wherein when the data transmitting SPI is idling and the data receiving process is performed, the hybrid SPI processing module keeps calculating a first receiving packet start address and a second receiving packet start address to make the host retrieve the first receiving packet start address and the second receiving packet start address from the configuration and status register and receive the data from the network through the RX buffer and through the data receiving SPI and the data transmitting SPI according to the first receiving packet start address and the second receiving packet start address.

11. The hybrid SPI of claim 1, wherein the host further comprises a micro-processing module and a memory module.

12. The hybrid SPI of claim 11, wherein the micro-processing module receives the data from the network through the RX buffer and stores the data into the memory module.

13. The hybrid SPI of claim 11, wherein the micro-processing module retrieves the data in the memory module and transmits the data to the network through the TX buffer.

14. A hybrid serial peripheral interface (SPI) data transmission method adapted in a hybrid SPI data transmission architecture of a network device, wherein the network device connects a host and a network, the hybrid SPI data transmission method comprises the steps of:

determining whether a data transmitting interrupt or a data receiving interrupt is generated according to the status of a receiving (RX) buffer and a transmitting (TX) buffer in the hybrid SPI data transmission architecture by a configuration and status register in the hybrid SPI data transmission architecture;

when both the data transmitting interrupt and the data receiving interrupt are generated, the host performs a data transmitting process through a data transmitting SPI to transmit data from the host to the TX buffer and further to the network, and the host performs a data receiving process through a data receiving SPI to receive data from the network to the RX buffer such that the host receives the data from the network through the RX buffer;

when the data receiving interrupt is not generated and the data transmitting interrupt is generated, the host determines that the data receiving SPI is idling and the data transmitting process is performed to make part of the data transmitted through the data receiving SPI to the TX buffer and further to the network; and when the data transmitting interrupt is not generated and the data receiving interrupt is generated, the host determines that the data transmitting SPI is idling and the data receiving process is performed to make part of the data received from the network through the RX buffer such that the host receives the data from the network through the RX buffer.

15. The hybrid SPI data transmission of claim 14, when the data determines that the data receiving SPI is idling and the data transmitting process is performed or that the data transmitting SPI is idling and the data receiving process, further comprising a step of:

receiving a command from the host to control a plurality of multiplexers in the hybrid SPI data transmission architecture to further control the data transmission paths between the data transmission SPI and the RX buffer and between the data transmission SPI and the TX buffer.

* * * * *